United States Patent [19]

Neudecker et al.

[11] 3,724,215
[45] Apr. 3, 1973

[54] DECOMPOSED AMMONIA RADIOISOTOPE THRUSTER

[75] Inventors: Joseph W. Neudecker; Kenneth C. Cooper, both of Los Alamos, N. Mex.

[73] Assignee: The United States of America as represented by the United States Atomic Energy Commission

[22] Filed: May 19, 1971

[21] Appl. No.: 144,954

[52] U.S. Cl. ..........................60/203, 165/105, 176/39
[51] Int. Cl. ..............................................F02k 11/00
[58] Field of Search ..60/203, 225, 229, 266; 176/39; 250/106 S, 108 R; 165/105

[56] References Cited

UNITED STATES PATENTS

| | | | |
|---|---|---|---|
| 3,353,354 | 11/1967 | Friedman et al. | 60/203 |
| 3,569,714 | 3/1971 | Anderson et al. | 250/108 R |
| 3,197,959 | 8/1965 | Keller | 60/229 |
| 3,302,042 | 1/1967 | Grover et al. | 176/39 |
| 3,516,487 | 6/1970 | Keiser | 176/39 |
| 3,447,321 | 6/1969 | Romero | 176/39 X |
| 3,525,386 | 8/1970 | Grover | 165/105 X |
| 3,451,641 | 6/1969 | Leventhal | 165/105 X |

*Primary Examiner*—Clarence R. Gordon
*Assistant Examiner*—Robert E. Garrett
*Attorney*—Roland A. Anderson

[57] ABSTRACT

A radioisotope heated propellant reaction control system wherein energy from the decay of plutonium-238 is used to heat and decompose ammonia propellant, and the decomposition products, nitrogen and hydrogen, are expanded through nozzles to provide desired increments of thrust. Three nozzles provide thrust levels of $10 \times 10^{-3}$ to $100 \times 10^{-3}$ $lb_f$ at a specific impulse of 310 seconds in a pulsing mode.

4 Claims, 4 Drawing Figures

INVENTOR.
Kenneth C. Cooper,
Joseph W. Neudecker

DECOMPOSED AMMONIA RADIOISOTOPE THRUSTER

BACKGROUND OF THE INVENTION

The invention described herein was made in the course of, or under, a contract with the U.S. ATOMIC ENERGY COMMISSION. It relates to radioisotope heated propellant reaction control systems and more particularly to a system wherein energy from the decay of a radioisotope is used to heat and decompose ammonia propellant, and the decomposition products, nitrogen and hydrogen, are expanded through a nozzle to provide desired increments of thrust.

Many communications and observational satellites require small "vernier" rocket engines for (1) orbital injection error correction, (2) station-keeping and repositioning, and (3) attitude acquisition and control. This is particularly true for a satellite placed in an earth synchronous or geosynchronous orbit which is a circular orbit in the equatorial plane with an orbital period of one sidereal day. In such an orbit the satellite will ideally remain fixed in space, relative to an observer on the earth. Satellites in these orbits typically perform missions as communications relays, navigational aids, and meteorological and strategic reconnaissance vehicles. Many of these missions require extremely close pointing accuracy and precise stationkeeping for a period of years.

A decomposed ammonia radioisotope thruster (DART) in which a radioisotope is used to heat and decompose ammonia prior to expansion through a nozzle offers significant improvement in specific impulse, weight, and reliability over chemical vernier engine propulsion systems now in use. However, any propulsion system utilizing a radioisotope energy source has several drawbacks not experienced by its chemical system counterparts. One is that it must meet nuclear safety specifications which require that the radioisotope remain completely contained within its fuel capsule during any launch pad or other accident and also during atmospheric reentry and impact. Another is that the radioisotope is a constant and essentially nonvariable heat source for satellite life spans up to 10 years. While this is an advantage in the vacuum of space, it requires that some form of cooling be employed in atmosphere to avoid materials degradation through oxidation caused by elevated temperatures.

A significant problem in the design of DART propulsion systems has been ensuring that the radioisotope fuel capsule will survive intact the thermal and pressure stresses and temperature it would be subjected to during atmospheric reentry. Efforts to resolve this problem heretofore have centered on placing the entire thruster unit within a reentry module.

We have now found that the radioisotope fuel capsule and its associated impact capsule can be effectively protected against the thermal and pressure stresses and temperature of atmospheric reentry by placing them within a reentry ablation capsule. All other parts of the DART unit, as for example, the thruster nozzles, insulation, and ammonia propellant heat transfer system, are outside the reentry capsule and would be allowed to burn up on reentry. The reentry capsule is required to be made of an ablative material having good thermal conductivity since during the operational life of the DART unit heat must be effectively and efficiently transferred from the radioisotope through the reentry capsule to the ammonia propellant heat transfer system. We have found that ATJS graphite is an excellent ablative material for this purpose.

We have further found that by using heat pipes inserted into the reentry ablative capsule to transfer excess heat to the atmosphere, the temperature within the DART unit can be kept under 200° C, thus preventing refractory structural materials from oxidizing before the satellite is inserted into orbit. The heat pipes represent a truly passive coolant system since they require no auxiliary pumping or monitoring apparatus.

It is therefore an object of this invention to provide an improved vernier engine for precise satellite control and stabilization. Another object is to provide an improved vernier engine comprising a decomposed ammonia radioisotope thruster (DART) unit. A further object is to provide a DART unit in which the radioisotope fuel capsule will remain intact during a launch pad or other accident and during atmospheric reentry and impact. Still another object is to provide a method by which a DART unit can be passively cooled.

BRIEF DESCRIPTION OF THE DRAWINGS

These and other objects of this invention will be apparent from the following description read in conjunction with the accompanying drawings wherein.

Figure 1:
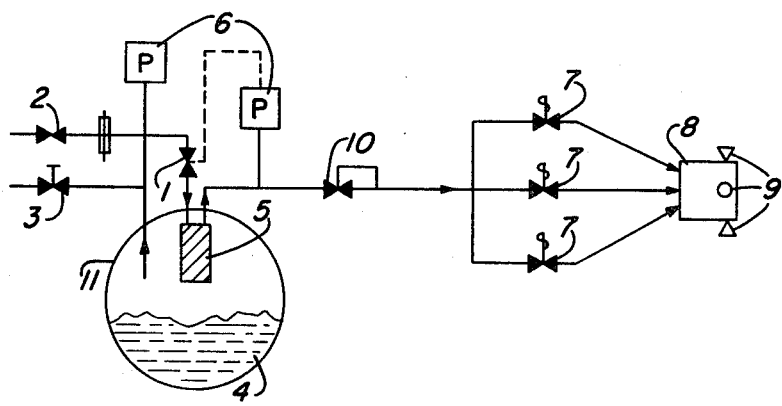
FIG. 1 is a schematic of a DART propulsion system.

The operation of a DART propulsion system is readily described with reference to the schematic of FIG. 1. Liquid ammonia 4 is introduced into a propellant storage tank 11 through a fill valve 3 and stored under its own equilibrium vapor pressure. Located within tank 11 may be a heater 5 to supply adequate heat of vaporization for the ammonia and to maintain a minimum tank pressure should ambient temperature fall below approximately 50° F. By means of pressure transducers 6 and a pressure control valve 1, pressure within tank 11 is prevented from becoming excessive. Should the pressure become too high, ammonia gas can be bled from tank 11 through relief valve 2. Nominally, the temperature within tank 11 will be 70° F and the pressure will be about 200 psia. During operation of the system, gaseous ammonia is introduced into a radioisotope thruster unit 8 through electrically controlled pulsing inlet valves 7. Nominally, pressure of ammonia to the inlet valves 7 is regulated at 50 psia by means of a fine pressure regulator 10. Within radioisotope thruster unit 8 the gaseous ammonia is heated and decomposed into hydrogen and nitrogen. The hot mixture of hydrogen and nitrogen is then allowed to expand through thrust nozzles 9 to provide a desired increment of thrust. Each of the inlet valves 7 provides an ammonia flow for a particular thrust nozzle 9. The invention described herein relates to radioisotope thruster unit 8.

Figure 2:
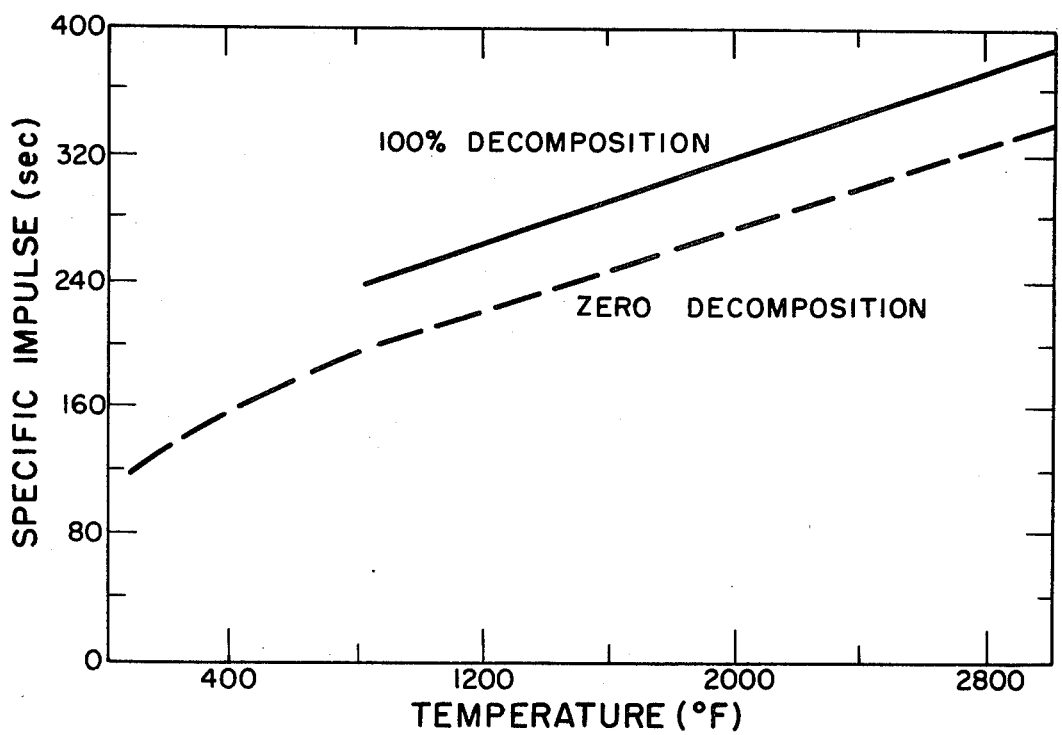
FIG. 2 shows the theoretical specific impulse of ammonia as a function of temperature.

It is apparent from FIG. 2 that the specific impulse that can be achieved using ammonia as a propellant is dependent on the temperature to which the ammonia is heated. At any particular temperature above the decomposition temperature of ammonia, a further substantial increase in specific impulse can be achieved if the ammonia is in fact completely decomposed to nitrogen and hydrogen and the mixture of these gases allowed to expand through a thrust nozzle.

PREFERRED EMBODIMENT

Figure 3:
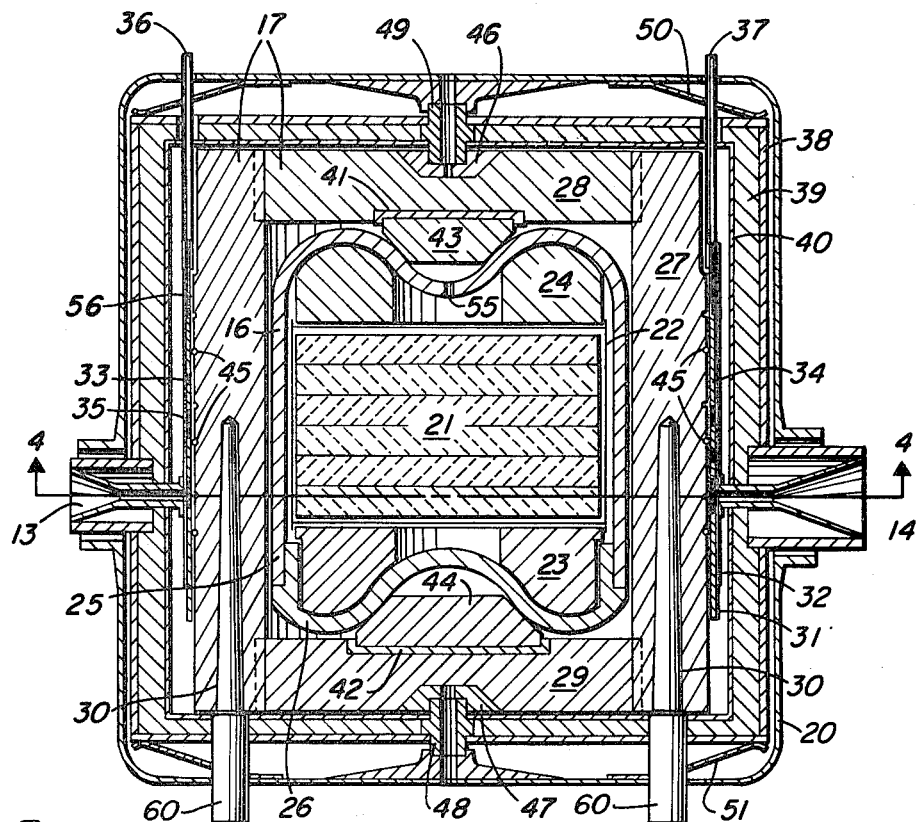
FIG. 3 is a cross-sectional view of the preferred embodiment of the DART unit.
Figure 4:
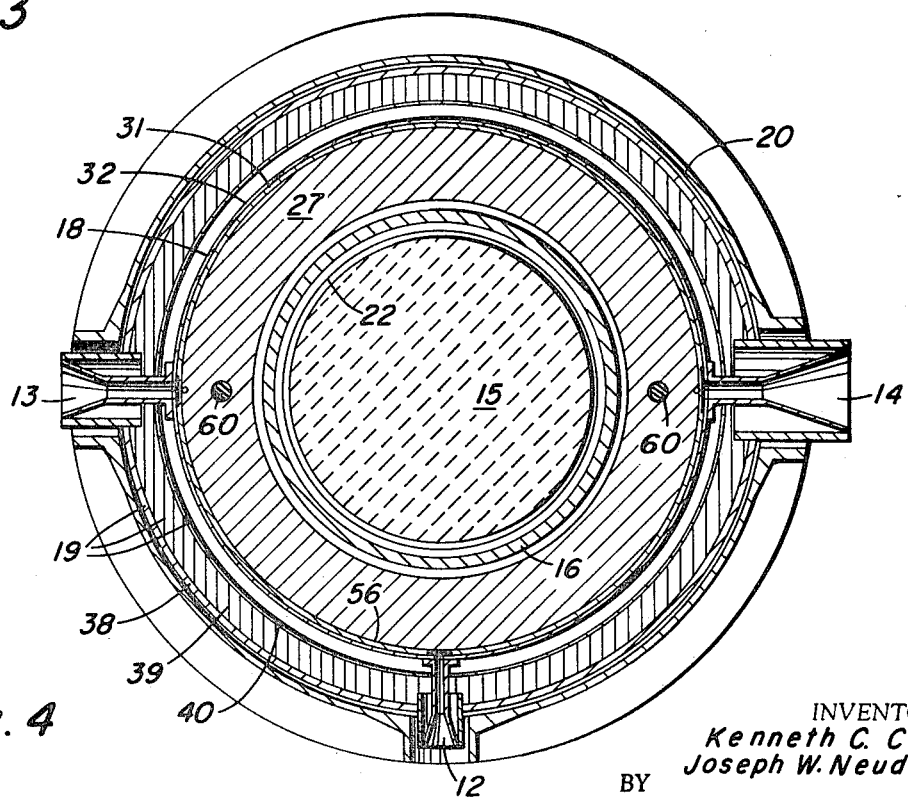
FIG. 4 is a cross-sectional view taken as indicated by the line 4—4 in FIG. 3.

FIGS. 3 and 4 are cross-sectional views of the preferred embodiment of this invention. The DART unit attains an exit gas temperature of 1370° C (2500° F) through the thrust nozzles and provides thrust levels of $10 \times 10^{-3}$ to $100 \times 10^{-3}$ $lb_f$ at a specific impulse of 310 seconds in a pulsing mode for a total satellite lifetime of seven years. There are three separate thrust nozzles 12, 13, and 14 with the following individual characteristics and thrust specifications:

| Nozzle | 12 | 13 | 14 |
|---|---|---|---|
| Diameter of Throat | 0.016 inch | 0.031 inch | 0.049 inch |
| Thrust | 10 mlb | 50 mlb | 100 mlb |
| Maximum Pulses | $5 \times 10^6$ | $5 \times 10^6$ | $5 \times 10^6$ |
| $NH_3$ Total Flow | 100 lb | 100 lb | 345 lb |
| $NH_3$ Flowrate (lb/sec) | $3.25 \times 10^{-5}$ | $1.62 \times 10^{-4}$ | $3.25 \times 10^{-4}$ |
| Maximum On-Time | 200 msec | 200 msec | 200 msec |
| Minimum On-Time | 20 msec | 20 msec | 20 msec |
| Minimum Off-Time | 800 msec | 2 sec | 4 sec |

In addition to nozzles 12, 13, and 14, the other major components of the DART unit are the radioisotope heat source 15, the impact capsule 16, the ablative reentry capsule 17, the heat transfer system 18, the insulation system 19, and the mounting can 20.

Plutonium-238, which is an alpha emitter having a half-life of 89 years, serves as the heat source 15. The plutonium is present in the form of cermet fuel wafers 21 which consist of hot pressed molybdenum-coated particles of either $PuO_2$—$ThO_2$ solid solution or solely $PuO_2$. Methods of fabricating these fuel wafers are given in Los Alamos Scientific Laboratory Reports LA-4476-MS and LA-4647-MS, available from National Technical Information Service, U. S. Department of Commerce, 5285 Port Royal Road, Springfield, Virginia 22151. A wafer 21 is approximately 2.2 inches in diameter and 0.22 inch thick and provides 40 watts of thermal power. Six wafers are deposited within fuel capsule 22 which is supported within impact capsule 16 by cushions 23 and 24. These cushions consist of molybdenum foamed to 35 percent of theoretical density.

Certain requirements are imposed on the materials of fuel capsule 22 and impact capsule 16. They must be strong at elevated temperatures, have a high creep and impact resistance over the temperature range from ambient to 1500° C, and be ductile both at ambient and elevated temperatures. In addition, they must not chemically react with the fuel at any temperature below 1800° C. Molybdenum-rhenium alloys selected from the range of Mo-46 wt. percent Re to Mo-20 wt. percent Re have been found to meet these overall requirements and hence are used as the material of fuel capsule 22 and impact capsule 16. Although all Mo—Re alloys oxidize, those having a lower weight percent of rhenium tend to have lower oxidation rates, especially at elevated temperatures. Hence, alloy selection is a compromise between strength-ductility values and an acceptable oxidation rate. In the preferred embodiment of this invention, Mo-46 wt. percent Re is used for fuel capsule 22 and impact capsule 16. Both capsules are assembled by welding, with impact capsule 16 being comprised of a female member 25 and a male member 26.

The isotope fuel being an alpha emitter results in the gradual release of helium gas from the fuel wafers. Over a longer period of time this helium gas, if not provided with a path of egress, would cause pressure to build up inside the fuel capsule 22 and impact capsule 16. The fuel capsule has a thin wall so that the helium gas pressure will rupture it quite easily. A 0.005-in. diameter vent hole 55 is provided in the impact capsule to permit the helium gas to vent to the vacuum of space.

The ablative reentry capsule 17 is composed of a cylinder 27 and two end plugs 28 and 29 of ATJS graphite. A reentry capsule must protect the impact capsule and the fuel against the heat generated during reentry by friction with the earth's atmosphere. Graphite is commonly used for the reentry capsule material, as it withstands high temperatures and absorbs some of the reentry heat by oxidative ablation of the surface.

Disposed immediately adjacent to but not in direct contact with graphite cylinder 27 is heat transfer system 18. This system consists of an inner, thicker cylinder 31 and an outer thinner cylinder 32. In the preferred embodiment of the invention, cylinders 31 and 32 are made of rhenium which is chemically inert to ammonia and its decomposition products, hydrogen and nitrogen, at temperatures up to 2500° C. It also catalyzes the decomposition of ammonia. Disposed within cylinder 31 and between cylinders 31 and 32 are three spiral grooves 33, 34 and 35 through which ammonia flows and is decomposed. Each groove makes one complete spiral from an ammonia inlet to a thrust nozzle. The ammonia inlet for a particular thrust nozzle is located directly in line with the nozzle it serves. Thus, ammonia inlet 36 connects by means of groove 34 with thrust nozzle 13, while ammonia inlet 37 connects by means of groove 35 with thrust nozzle 14. Cylinders 31 and 32 are electron beam welded together between the spiraled grooves, thus forming each groove into a channel through which ammonia and its decomposition products flow.

For efficient operation of the DART unit it is essential that heat transfer system 18 be effectively insulated from the space environment. It is desirable that insulating system 19 function such that there is a minimum variation in temperature in heat transfer system 18 between full thrusting with maximum heat transfer to the propellant and zero thrust so as to maintain as closely as possible a nominal thruster operating temperature of 1370° C. To ensure this, insulating system 19 operates primarily by the principles of radiation heat transfer, in which the heat transfer varies as the fourth power of the temperature. In the preferred embodiment of the invention, insulating system 19 is composed of an outer insulation cup 38 made of stainless steel, insulation 39, and an inner insulation cup 40 made of molybdenum. Insulation 39 consists of 90 layers of molybdenum foil, 0.0005-in. thick, each layer separated from its neighboring layers by zirconia present either in the form of particles or as woven zirconia cloth.

The interdiffusion of materials becomes a problem at the elevated temperatures present in the DART unit. Therefore, some different materials must be separated from each other by diffusion barriers. These diffusion barriers are incorporated into the support structure; hence, they effectively serve dual purposes. The support structure separating Mo-Re impact capsule 16 from graphite ablative reentry capsule 17 consists of tantalum disks 41 and 42, which carburize to tantalum carbide at elevated temperatures, and zirconium carbide support cones 43 and 44. Rhenium heat transfer system 18 is separated from graphite ablative reentry capsule 17 by tantalum wire 45 wrapped around cylinder 27. This provides a gap 56 about 10 mils wide between heat transfer system 18 and cylinder 27. At operating temperatures, wire 45 becomes tantalum carbide which acts as a diffusion barrier. Ablative reentry capsule 17 is supported within insulation system 19 by tantalum carbide cones 46 and 47, also good diffusion barriers. Mounting can 20 is attached to insulating system 19 by means of zirconia bushings 48 and 49 and held in proper orientation to insulating system 19 by the disk spring action of the flat ends of mounting can 20. The outer insulation cup 38 is held in axial position by leaf springs 50 and 51.

The DART unit, being insulated, attains an internal temperature of approximately 1400° C during operation in the vacuum of space. However, refractory structural materials such as rhenium and molybdenum begin to significantly oxidize at temperatures above 300° C. To prevent this, it is necessary during all time prior to launch to either isolate the unit from oxygen or cool it to temperatures below 300° C. The latter approach is the most feasible. In the preferred embodiment of this invention, two heat pipes using water as the working fluid provide the necessary cooling. Such heat pipes 60 are well described in the literature. The heat pipes are placed in wells 30 in cylinder 27 and extend through insulation system 19 and mounting can 20. During storage of the DART unit or prior to launch, these heat pipes radiate and convect heat to the atmosphere. Before launch they are removed and the vehicle is launched expeditiously so that the unit is placed in orbit prior to attaining a temperature of 300° C. Alternatively to the use of heat pipes, cold nitrogen may be circulated through heat transfer system 18 to cool the unit before launch.

It will be apparent to one of ordinary skill in the art that what has been disclosed is a vernier rocket engine system having low electrical power requirements, relatively high specific impulse, high reliability of operation, a lifetime in excess of seven years, a propellant free of troublesome handling problems, excellent pulsing capabilities, and a weight less than that of comparable chemically fueled systems. It will be further apparent that the DART unit herein disclosed is but a specific embodiment of a more general family of decomposed ammonia radioisotope thruster vernier rocket engines, and that the design and operating parameters of the unit disclosed by example herein may readily be varied to meet a wide variety of orbital station keeping and attitude acquisition and control requirements.

What we claim is:

1. A radioisotope heated propellant reaction control system wherein energy from the decay of plutonium-238 is used to heat and decompose ammonia propellant, and the decomposition products, nitrogen and hydrogen, are expanded through nozzles to provide desired increments of thrust, comprising in combination, a plutonium-238 fuel,
   a fuel capsule for containing said fuel,
   an impact capsule for containing said fuel capsule,
   a graphite ablative reentry capsule,
   a heat transfer system containing a plurality of channels wherein ammonia is heated and decomposed to nitrogen and hydrogen,
   a plurality of ammonia inlet tubes connected to said heat transfer system, each of said tubes connected to the entrance end of a particular channel in said heat transfer system,
   means for controlling the flow of ammonia through said inlet tubes,
   a plurality of thrust nozzles, each of said nozzles connected to the exit end of a particular channel in said heat transfer system,
   an insulating system disposed adjacent to the outer periphery of said heat transfer system, with said thrust nozzles extending through said insulating system, and
   a mounting can,
   said ablative reentry capsule encompassing said impact capsule and disposed between said impact capsule and said heat transfer system.

2. The reaction control system of claim 1 wherein said plutonium-238 fuel comprises wafers of hot-pressed molybdenum-coated $PuO_2$ particles.

3. The reaction control system of claim 1 wherein said plutonium-238 fuel comprises wafers of hot-pressed molybdenum-coated solid solution $PuO_2$—$ThO_2$ cermet particles.

4. The reaction control system of claim 1 containing a plurality of water heat pipes inserted into wells in said ablative reentry capsule to cool said system below 200° C, said heat pipes extending through the insulation system and the mounting can and being removable from said ablative reentry capsule before launch.

* * * * *